Patented June 19, 1945

2,378,689

UNITED STATES PATENT OFFICE 2,378,689

GAS PURIFICATION

Benjamin W. Collins, Swarthmore, Pa., assignor to American Viscose Corporation, Wilmington, Del., a corporation of Delaware No Drawing. Application January 28, 1943, Serial No. 473,853

10 Claims. (Cl. 23—181)

This invention concerns the manufacture of artificial filaments by the viscose process and is particularly concerned with the removal and recovery of the hydrogen sulfide from the exhaust gases fom the spinning room.

It has heretofore been proposed to employ alkaline solutions such as those of sodium hydroxide, calcium hydroxide, or ferrous hydroxide, or mixtures thereof, for absorbing the hydrogen sulfide from such exhaust gases. Because of the presence of carbon dioxide of the air in the exhaust gases, the use of calcium or ferrous hydroxide, singly or mixed (the latter agent usually being accompanied with a catalyst, such as manganese sulfate to accelerate oxidation to the ferric condition by the air) involves the formation of large quantities of the insoluble carbonates or basic carbonates of calcium and iron as well as the insoluble sulfate and sulfide of calcium and the insoluble hydroxides and sulfides of iron. Frequently such carbonates constitute as much as twice the amount of the sulfides and other precipitated salts and hence the consumption of the absorption agents is proportionally increased. In addition, the sludge product obtained by the use of the latter absorbing compounds is generally discarded because of its low recovery value and, because of its tendency to hydrolyze, it creates an additional problem of disposal to prevent the development of a nuisance.

It is an object of this invention to provide an improved process for the removal of hydrogen sulfide from air or other gaseous media. A further object is to effect such removal by an absorption agent under controlled conditions whereby any carbon dioxide in the air or gas being treated does not increase the consumption of the absorbing agent and it does not form absorption by-products, thereby eliminating the necessity of providing special handling of the sludge obtained. A further object of the invention is to provide a cyclic process in which the product obtained in the step of absorbing the hydrogen sulfide is reconverted into the absorbing agent at least a part of which is recycled to the hydrogen sulfide absorption system and any excess over that needed in the absorption is used in the viscose spinning bath. Further objects and advantages of the invention will be apparent from the description hereinafter.

In accordance with this invention, an absorption medium is used which comprises a water soluble zinc salt of a strong acid, such as hydrochloric acid, sulfuric acid, acetic acid, and the like, in dilute concentration up to about 5% and contains suspended therein a zinc compound which is alkaline in character, such as zinc oxide or zinc hydroxide, or which yields hydroxyl ions under the conditions within the absorbing medium and thereby effectively neutralizes the tendency of the absorbing medium to become acid as a result of the reaction between hydrogen sulfide and the zinc salt of the strong acid. An example of a compound which becomes alkaline under the conditions of the medium is a zinc salt of a weak acid, such as the carbonate. The fact that zinc oxide, for example, can exist as a suspended solid in dilute concentrations of sulphuric acid is due to the well known amphoteric properties of zinc compounds.

Such a medium is in effect a buffered medium with its pH controlled to a point slightly below seven as long as an undissolved excess of the alkaline or hydroxyl-ion-generating zinc compound is present. Depending on the particular components, the pH at equilibrium may differ somewhat, but is never above seven nor on the other hand very far below seven.

The exhaust gases containing the hydrogen sulfide and other usual constituents such as occur in air, such as carbon dioxide, are brought into contact with the absorption medium within a suitable absorption device, preferably constructed for continuous counter-current operation. Although the absorption medium is slightly acid, it is not so strongly acid as to prevent the precipitation of zinc sulfide by the interaction of the hydrogen sulfide with the zinc ions. Hydrogen ions tend to be generated in accordance with the following equation:

$$H_2S + ZnSO_4 \rightarrow ZnS + H_2SO_4$$
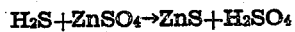

but the presence of the suspended alkaline or hydroxyl-ion-generating zinc compound prevents increase in acidity in accordance with the following equation:

$$H_2SO_4 + ZnO \rightarrow ZnSO_4 + H_2O$$
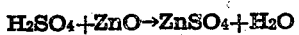

Because of the presence of the suspended alkaline zinc compound, the acid generated is immediately expended in dissolving part of the suspended compound and at the same time prevents the medium from becoming so acid as to dissolve the zinc sulfide and thereby nullify the absorption.

The rate at which the absorption medium is introduced into the system should be controlled with respect to the amount of hydrogen sulfide that it absorbs in passing through the absorption system so that at least some proportion of the alkaline zinc compound, such as the zinc oxide, remains unconverted at the time of discharge from the absorption system. In this manner, the pH of the system remains controlled throughout the system. For the system in which an excess of zinc oxide is suspended in a zinc sulfate solution of about 0.5% concentration, the pH is controlled substantially at 6.3. At such an acidity, the zinc sulfide remains undissolved and the carbon dioxide present in the gas being treated is unaffected by the absorption system.

The spent absorption medium discharged from the absorption system consists of a mixture of zinc oxide and zinc sulfide suspended in the zinc sulfate solution. The suspended zinc sulfide and zinc oxide is filtered from the absorption medium and is decomposed in a suitable vessel with a strong acid (sulfuric acid where that is the salt desired to be used in the absorption medium) to liberate in concentrated form the hydrogen sulfide and to produce a solution of zinc sulfate in accordance with the following equation:

$$ZnS + ZnO + H_2SO_4 \rightarrow ZnSO_4 + H_2S + H_2O$$

The hydrogen sulfide thus obtained may be converted by sodium hydroxide into sodium sulfide which can then be used for desulfurizing regenerated cellulose filaments obtained from viscose in the normal manufacture of rayon. Alternately, the hydrogen sulfide, or part of it, may be burned to sulfur dioxide and converted to sulfuric acid which may then be used to fortify the viscose spinning bath. The zinc sulfate solution resulting from the treatment of the zinc sulfide and zinc oxide sludge with sulfuric acid is then divided into two parts. To one part, zinc oxide or other hydroxyl-ion-generating or alkaline zinc compound is added and the resulting suspension, after suitable dilution where necessary, is recycled to the absorption system. The other part, with or without concentration, is used to replenish, before recirculation, the spent and reconditioned spinning bath used for making filaments, films and the like from viscose.

In this manner, instead of adding zinc oxide directly to the spinning bath, it is first put through a hydrogen sulfide absorption system and the zinc sulfate resulting therefrom (indirectly by subsequent decomposition of the zinc oxide and the zinc sulfide suspension discharged from the absorption system) is used to restore the spinning bath to the proper strength with respect to zinc content.

While the detailed description of the procedure given above specifically mentions zinc sulfate and sulfuric acid, these are preferred merely because sulfuric acid is the acid generally used in the viscose spinning bath. It is to be understood, however, that other strong acids such as hydrochloric acid, may be used to convert the sludge obtained during the filtration of the spent absorption medium and that the zinc salt, such as zinc chloride, thereby obtained may be added to the viscose spinning bath or recycled into the absorption system. In addition, the zinc oxide specifically mentioned in the detailed description may be replaced by other alkaline or alkali-generating substances, such as zinc hydroxide or zinc carbonate.

The invention thus provides a system for the absorption of hydrogen sulfide from the exhaust gases from the viscose spinning rooms which utilizes as the absorption agent a compound of zinc which can be used after its service in absorbing the hydrogen sulfide is completed for fortifying the spinning bath, particularly of the type used for making high tenacity rayon from viscose, which bath generally contains a zinc salt, such as zinc sulfate. The by-product, other than the zinc sulfate or zinc salt, which can be utilized in practice is the hydrogen sulfide itself which can be converted either into sulfuric acid for the spinning bath or into sodium sulfide for desulfurizing rayon produced from viscose. As pointed out hereinabove, other advantages reside in the controlled pH which prevents the precipitation of carbonates while not interfering with the precipitation of the sulfide.

While preferred embodiments of the invention have been disclosed, the description is intended to be illustrative only, and it is to be understood that changes and variations may be made without departing from the spirit or scope of the invention as defined by the appended claims.

I claim:

1. In the method of removing hydrogen sulfide from gas containing it, the step of bringing said gas into intimate contact with a dilute aqueous solution of a water-soluble zinc salt of a strong acid containing suspended therein at all times during such contact an at least partially undissolved zinc compound which is reactive with the strong acid so that the amount of potentially available zinc ions present is at all times in excess of that required to form the normal salt with the strong acid.

2. In the method of removing hydrogen sulfide from a gas containing it, the steps of continuously bringing a stream of said gas into intimate contact with a portion of a dilute aqueous solution of a water-soluble zinc salt of a strong acid containing suspended therein at all times during such contact an at least partially undissolved zinc compound which is reactive with the strong acid so that the amount of potentially available zinc ions present is at all times in excess of that required to form the normal salt with the strong acid, and introducing said gas into a fresh portion of said solution before the undissolved portion of the zinc compound becomes exhausted in the first portion.

3. In the method of removing hydrogen sulfide from a gas containing it, the step of bringing said gas into intimate contact with a dilute aqueous solution of a soluble zinc salt of a strong acid containing suspended therein at all times during such contact an at least partially undissolved alkaline zinc compound.

4. In the method of removing hydrogen sulfide from a gas containing it, the step of bringing said gas into intimate contact with an aqueous solution of about 0.5% to 5% concentration of a water-soluble zinc salt of a strong acid containing suspended therein at all times during such contact an at least partially undissolved zinc compound which is reactive with the strong acid so that the amount of potentially available zinc ions present is at all times in excess of that required to form the normal salt with the strong acid.

5. In the method of removing hydrogen sulfide from air containing it and carbon dioxide, the step of bringing said air into intimate contact with a dilute aqueous solution of a water-soluble zinc salt of a strong acid containing suspended therein at all times during such contact an at least partially undissolved zinc compound which is reactive with the strong acid so that the amount of potentially available zinc ions present is at all times in excess of that required to form the normal salt with the strong acid.

6. In the method of removing hydrogen sulfide from air containing it and carbon dioxide, the step of bringing said air into intimate contact with an aqueous solution of a water-soluble zinc salt of a strong acid containing suspended therein at all times during such contact an at least partially undissolved alkaline zinc compound.

7. In the method of removing hydrogen sulfide from air containing it and carbon dioxide, the step of bringing said air into intimate contact with a dilute aqueous solution of zinc sulfate containing suspended therein at all times during such contact an at least partially undissolved alkaline zinc compound.

8. In the method of removing hydrogen sulfide from air containing it and carbon dioxide, the step of bringing said air into intimate contact with an aqueous solution of about 0.5% to about 5% concentration of zinc sulfate containing suspended therein at all times during such contact an at least partially undissolved zinc oxide.

9. In the method of removing hydrogen sulfide from air containing it and carbon dioxide, the steps of bringing a stream of said air into intimate contact with a portion of an aqueous solution of about 0.5% to about 5% concentration of zinc sulfate containing suspended therein an at least partially undissolved zinc oxide, and introducing said air into a fresh portion of said solution before the undissolved portion of said zinc oxide becomes exhausted in the first portion.

10. In the method of removing hydrogen sulfide from a gas containing it, the steps of bringing said gas into intimate contact with a dilute aqueous solution of a water-soluble zinc salt of a strong acid containing suspended therein at all times during such contact an at least partially undissolved zinc compound which is reactive with the strong acid so that the amount of potentially available zinc ions present is at all times in excess of that required to form the normal salt with the strong acid, filtering the sludge from the spent absorption solution, acidifying the sludge, permitting the hydrogen sulfide generated to be evolved therefrom, adding a fresh portion of said above-mentioned undissolved zinc compound to the resulting solution and returning it to absorb additional hydrogen sulfide from a fresh portion of said gas.

BENJAMIN W. COLLINS.